United States Patent [19]

Oscarsson

[11] 4,341,005
[45] Jul. 27, 1982

[54] MANUFACTURE OF HOLLOW FIBER FLUID FRACTIONATING CELLS

[75] Inventor: Rolf A. Oscarsson, Andover, Mass.

[73] Assignee: Strimbeck, Davis & Soloway, Manchester, N.H. ; a part interest

[21] Appl. No.: 204,465

[22] Filed: Nov. 6, 1980

[51] Int. Cl.³ .................. B23P 17/00; B23P 3/00; B23P 19/04
[52] U.S. Cl. .................. 29/411; 29/412; 29/424; 29/460; 29/157 R; 55/158; 210/321.1; 242/18 G; 242/43 R; 242/53; 264/258; 264/263
[58] Field of Search .............. 29/411, 412, 424, 460, 29/157 R, 458; 242/18 G, 43 R, 53; 544/26; 210/221, 321 R, 321.1, 321.3, 321.5; 55/158; 264/258, 263

[56] References Cited

U.S. PATENT DOCUMENTS

| | | | |
|---|---|---|---|
| 3,728,526 | 4/1973 | Youngblood | 364/153 |
| 3,884,814 | 5/1975 | Vogt et al. | 210/321.1 |
| 3,998,816 | 12/1976 | Seki et al. | 544/26 X |
| 4,031,012 | 6/1977 | Gics | 210/321.3 |
| 4,038,190 | 7/1977 | Baudet et al. | 210/321.1 |
| 4,045,851 | 9/1977 | Ashare et al. | 29/157 R |
| 4,061,574 | 12/1977 | Clark | 210/321.1 |
| 4,077,578 | 3/1978 | Cromie | 242/43 R X |
| 4,267,630 | 5/1981 | Sebring | 29/411 |
| 4,276,687 | 7/1981 | Schnell | 29/411 X |

Primary Examiner—Charlie T. Moon
Attorney, Agent, or Firm—Strimbeck, Davis & Soloway

[57] ABSTRACT

Hollow fiber fluid fractionation cells such as used in artificial kidney machines are manufactured by placing a series of half sections of the longitudinal walls of the cell on the periphery of a winding wheel; winding fluid-filled permeable hollow fibers thereabout until the section is full or slightly over-full; placing another mating half shell over each fiber-filled section on the wheel and assembling the cell core; cutting the courses between each section and draining the fluid therefrom; putting an initial fluid potting compound about the courses of fibers and centrifugally casting the potting compound about the fibers at each end of the cell; cutting the fibers at each end within the area of the potting compound to re-expose the hollow cores thereof and placing end caps on and affixing them to each end of the cell to complete the assembly of the cell.

6 Claims, 3 Drawing Figures

MANUFACTURE OF HOLLOW FIBER FLUID FRACTIONATING CELLS

PRIOR ART

| U.S. Pat. No. | Date |
| --- | --- |
| 4077578 | March 7, 1978 |
| 4031012 | July 26, 1977 |
| 4031012 | June 21, 1977 |
| 3998816 | November 20, 1976 |
| 3884814 | May 20, 1975 |
| 3728526 | April 17, 1973 |

This invention pertains to an improved method of manufacturing hollow fiber fluid fractionating cells using a "ferris wheel" method of laying successive courses of the permeable fiber in sections of the cell walls. See U.S. Pat. No. 4,038,190, FIG. 14.

The present invention is an improvement over the procedure shown in this patent. In the patent the fibers after being laid are potted within the cell section while the sections are still on the winding device after which the fibers are cut to free the sections and the cell is completed by the addition of a cell wall and endcaps. This procedure is awkward inasmuch as it is difficult to get good placement of the potting compound.

In the present invention the hollow fiber is wound in the cell sections to fill fully the cell sections. The other half of the cell section is then put in place over the fibers in each section to complete the side walls of the cell core and the two sections are secured together. The fibers between the cell cores are then cut and the cores are removed from the winding device. The fibers at the ends of the cell are thereafter potted by centrifugal castings which also permits the potting compound to join with or to adhere to the cell walls as well as to the fibers. Following this potting the ends of the fibers are again cut in the area of the potting compound to re-expose the hollow cores and endcaps are sealed on to the cell to complete the unit.

By the present method the core of the cell consists entirely of the hollow fibers and does not contain any wall sections or mandrels used to hold or shape the course of fiber during winding. Thus the core of the cells are 100% utilized for their intended function.

Also, the fibers can be laid somewhat randomly oriented or askew to secure a loose bundle without an undue amount of surface to surface contact between the fibers. This increases the exposed surface area and promotes turbulent flow. One does not want to make the fiber bundle too compact.

One of the distinguishing characteristics of the present process is that the fibers are locked in place after winding and not permitted any movement prior to being affixed by the potting compound.

In brief compass, this invention is a method of making fluid fractionating cells which cells have a multiplicity of generally parallel laid permeable hollow fibers contained within fluid tight casings. The method of the present invention comprises the steps of:

A. A series of longitudinal sections of cell casings consisting of at least two walls are prepared.

B. These sections are arranged in a polygonal pattern about the periphery of a winding wheel with one of the side walls of each section facing outwardly alternately on each side from section to section.

C. Filaments of the hollow fiber, usually fluid-filled, are then wound over the long longitudinal sections to build up a bundle. The bundle is kept in place by the outwardly facing side walls until built up fully with the amount of fiber required for a cell core.

D. An empty longitudinal section is then placed over each fiber bundle in each section and secured to hold the fiber in place and the fiber bundle between each cell core thus formed is severed. The cells are then removed from the winding wheel.

E. A liquid potting compound is introduced around the fibers at each end of a cell core and is centrifugally cast at each end of the cell core in situ about the fibers by spinning the cell core.

F. After the potting compound has set, the ends of the fibers are cut at each end of the cell core in the area of the potting compound again laying open the hollow cores of the fiber bundle.

G. Endcaps are placed on and sealed to each end of the cell to complete the cell structure. Either the cell walls and/or the cell caps have openings and connections to permit the introduction and removal of fluids to the cell, as is known.

DRAWINGS

DESCRIPTION

Figure 1:
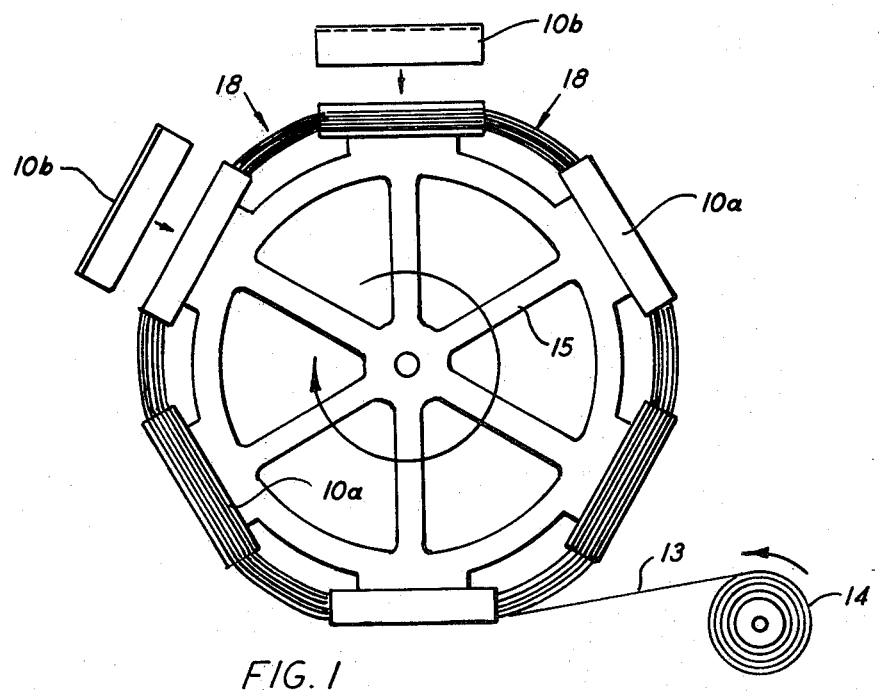
FIG. 1 illustrates a "ferris wheel" winding device for filling cell sections with permeable hollow fiber filaments.

With reference to FIG. 1, a "ferris wheel" winding device 15, reminiscent of a wagon wheel and rotated in the direction shown by a drive means not illustrated, has attached to its periphery six half longitudinal sections 10a of fractionating cells arranged in a hexagonal pattern. Each section comprises a flat side wall approximately three inches wide and ten inches long and an upright outwardly facing side wall sufficient to give a finished fiber bundle about approximately one-half inch thick. This will yield a finished cell housing about 1 square meter of transfer surface using a C-1 IM fiber supplied by Enka Glanstof AG, Wupertal, West Germany.

As illustrated the sections 10a are oriented on the winding device so that side walls alternate from one side to the other. This holds the fiber in place as it is wound onto the sections.

Fluid-filled permeable hollow fiber filaments 13 supplied from reel 14 are wound into sections 10a until they are filled with 100% of the fiber required to make a cell core. The mating sections 10b for each section are then placed over the sections 10a to hold the fiber bundle. The fibers between each section 10 are cut as indicated by the arrows 18 to free the completed core 11. The seams between sections 10a and 10b can be made fluid tight either before or after removal of the core.

At this point, the fibers in each core bundle are drained of fluid and washed. They can be end sealed as with a tape if it is necessary to prevent the potting compound from entering the cut fiber ends.

Figure 2:
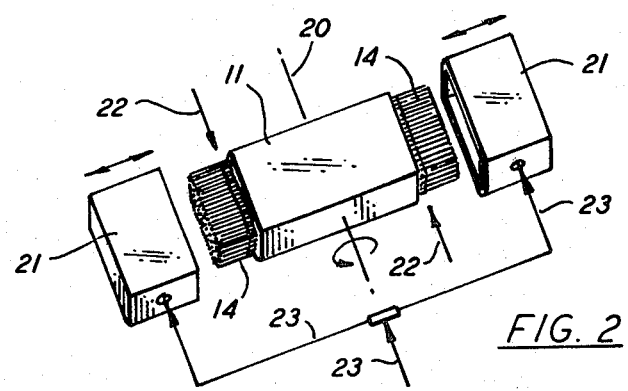
FIG. 2 shows an individual cell core assembled from two sections filled with fibers and about to have a potting compound introduced.

Referring to FIG. 2, a cell core 11 has temporary endcaps 21 made of a flexible compound such as silicone rubber to which the potting compound will not adhere, placed over the ends of the casing (10a and 10b) and the ends of the protruding fiber bundle. The assembly is then placed in a suitable jig that rotates the assembly rapidly about its center of rotation, 20, as illustrated in FIG. 2. A fluid potting compound such as Biothane 237, a medical grade polyurethane (N.L. Chemical Co., Wycoff Mills Rd., Highstown, N.J. 08520) is introduced by line 23 into each endcap and flows in and about the ends of the fibers in the bundle. Radiant heat can be applied to speed the cure of the potting compound. Centrifugal force holds the potting compound in place until it solidifies.

As potting compound is applied to both ends of the fiber bundle, a pocket of air is trapped in each fiber which prevents the potting compound from rising as far up into the insides of the fibers as it does on the outside. It may rise ¼ to ⅜ inch in each fiber. If a fiber is broken or crushed, the air pocket in the fiber will be released and the potting compound will rise therein and seal the fiber off. This is a desirable security feature of the process of this invention. Of course, the open ends of the fibers can be sealed prior to potting with a tape or by buttering on a heavy sealing compound but this does do away with the ability of the process to seal off defective fibers in the bundle.

Only a sufficient amount of potting compound is used to fill the ends of the core and the center section of the fiber bundle is free of any compound. The potting compound firmly bonds to the side walls of the case, as well as to the fibers, making a tough integral structure.

Temporary endcaps 21 are then removed and the fiber bundles 14 at each end of the casing are cleanly and smoothly cut near the end of the casing in the area where the potting compound exists as indicated by arrows 22. This re-exposes the hollow cores of the fibers.

The partially completed cell at this point prior to the attachment of a permanent endcap can be inspected if desired as by pressure testing to assure that all is in good order and that the cell is functioning properly.

Figure 3:
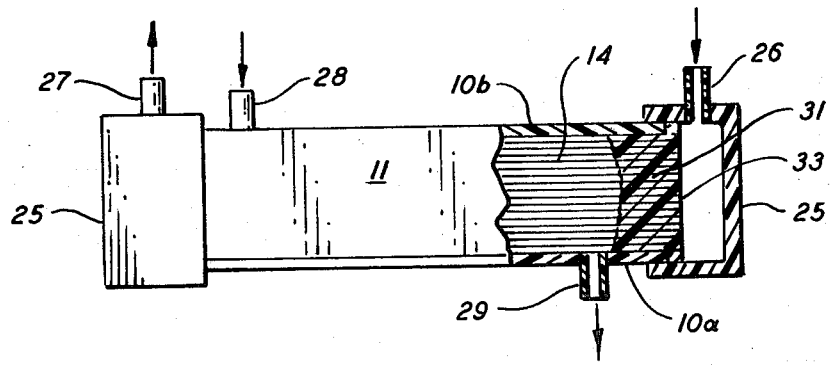
FIG. 3 illustrates in part in broken away section, a completed fluid fractionating cell.

With reference to FIG. 3, the completed cell comprises a central portion 11 contained within the sections 10a and 10b made as above-described. As shown in the broken-away portion of FIG. 3, potting compound 31 holds the fibers of bundle 14 firmly in place and prevents passage of liquid about the fibers. The ends 33 of the fibers are cleanly cut, exposing the hollow cores of the fibers to the fluid chambers created by endcaps 25. Endcaps 25 are placed on and sealed to the core 11, as illustrated. These caps have an inlet conduit 26 for fluid and an outlet conduit 27 to remove the fluid that has passed through the fibers. The main section 11 of the cell has an inlet conduit 28 to permit the entrance of fluid to pass around the exterior of the hollow fibers, and an outlet 29 to remove this fluid. The configuration or placement of such inlets and outlets can be varied to suit the fractionating cell to its intended purpose. Inlets and outlets such as 28 and 29 may be placed on the shell or casing prior to the time it is wound with fiber.

While a rectangular configuration of the fractionating cell has been shown, it could as well be some other shape, such as circular, and the longitudinal sections could be half-cylindrical sections. In this case, the sections would be filled with one-half of the amount of fiber required for a cell core, the fiber bundles at the end of each section would be clamped or tied down prior to the removal of the cell sections from the winding device, two half sections would be assembled after removal from the winding device and the bundle clamps then removed.

The configuration of the cell is not an essential feature of this invention. What does distinguish the present invention is the assembly of the cell core and the removal of the fiber-filled cell core from the winding device prior to the placement of the potting compound. This necessitates a second cutting or shaving of the ends of the fiber bundle in the core to re-expose the hollow cores of the fibers embedded in the potting compound. While the present method of constructing the cell is economical it produces a cell having a high performance and reliability.

What is claimed is:

1. A method of making fluid fractionating cells the cores of which have a multiplicity of permeable hollow fibers contained within fluid tight casings, comprising the steps of:
    (a) affixing a series of longitudinal sections of fractionating cell casings to the periphery of a winding means having a central axis of rotation;
    (b) winding filaments of said hollow fiber over and onto said longitudinal sections on said periphery and building up a bundle thereof in each section;
    (c) assembling another of said longitudinal sections about said bundles in each section and forming a cell core firmly holding the fibers in place in said bundle;
    (d) severing the fibers between each cell core and removing the cell cores from said winding means;
    (e) potting said fibers at each end of a cell core by introducing a liquid potting compound thereabout and centrifugally casting the potting compound in each end in situ by rotating said cell core about a transverse axis of rotation thereof;
    (f) cutting the ends of the fibers at each said end in the area of said potting compound and laying open the cores thereof; and
    (g) placing an endcap on each end so potted to complete said cells.

2. The method of claim 1 wherein said cells are rectangular in cross section and each said longitudinal section is one-half of the walls of said cell core, and wherein the section on said winding means is filled with 100% of the fiber required for said cell core.

3. The method of claim 1 wherein during step (e) a pocket of air is trapped in each fiber by said liquid potting compound which pocket of air prevents said liquid potting compound from rising as far up into the fibers as said liquid potting compound rises on the outside thereof.

4. A method of making fluid fractionating cells which cells have a multiplicity of generally parallel laid permeable hollow fibers contained within fluid tight casings, comprising the steps of:
    (a) preparing a series of longitudinal sections of fractionating cell casings each section of which comprises at least two abutting relatively straight side walls of a cell;
    (b) affixing said series of longitudinal sections to the periphery of a winding means having a central axis of rotation with one wall of said side walls being tangential to said periphery and the other facing outwardly and with the outwardly facing side walls alternating from one side to the other from longitudinal section to longitudinal section about said periphery;

(c) winding filaments of said hollow fiber over and onto said longitudinal sections on said periphery keeping said filaments within said outwardly facing side walls, and building up a bundle thereof in each said longitudinal section;

(d) assembling another of said longitudinal sections over each section so filled with said hollow fiber and forming a cell core;

(e) cutting the fiber bundle between each such cell core on said winding means and freeing the cell core;

(f) potting said hollow fibers at each end of said cell cores by centrifugal casting a limited amount of liquid potting compound in each end in situ about said courses by spinning said cell cores about a transverse axis of revolution;

(g) cutting the ends of the fibers at each said end in the area of said potting compound and laying open the cores thereof; and (h) placing an endcap on each end so potted to complete said cells.

5. The method of claim 4 wherein said hollow fibers are initially filled with a fluid, wherein following step (e) the fibers are drained and washed.

6. The method of claim 4 wherein said cell cores between the walls of said longitudinal sections are filled 100% with said hollow fibers and are free of any winding mandrels.

* * * * *